United States Patent
DeFelice et al.

(10) Patent No.: US 11,090,838 B2
(45) Date of Patent: *Aug. 17, 2021

(54) POLYMER POWDER AND METHOD OF PREPARING THE SAME

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,290

(22) Filed: Apr. 21, 2020

(65) Prior Publication Data

US 2020/0247013 A1 Aug. 6, 2020

Related U.S. Application Data (63) Continuation of application No. 15/872,598, filed on Jan. 16, 2018, now Pat. No. 10,661,479.

(60) Provisional application No. 62/446,460, filed on Jan. 15, 2017, provisional application No. 62/446,464, filed on Jan. 15, 2017, provisional application No. 62/446,470, filed on Jan. 15, 2017, provisional application No. 62/446,462, filed on Jan. 15, 2017.

(51) Int. Cl.

| | |
|---|---|
| *C08L 71/12* | (2006.01) |
| *B29B 9/16* | (2006.01) |
| *B33Y 70/00* | (2020.01) |
| *B29C 64/153* | (2017.01) |
| *B02C 23/10* | (2006.01) |
| *C08G 65/46* | (2006.01) |
| *B33Y 10/00* | (2015.01) |
| *C08G 65/40* | (2006.01) |
| *C08J 3/12* | (2006.01) |
| *C08J 5/04* | (2006.01) |
| *B29K 71/00* | (2006.01) |

(52) U.S. Cl.
CPC .............. *B29B 9/16* (2013.01); *B02C 23/10* (2013.01); *B29C 64/153* (2017.08); *B33Y 10/00* (2014.12); *B33Y 70/00* (2014.12); *C08G 65/4012* (2013.01); *C08G 65/46* (2013.01); *C08J 3/12* (2013.01); *C08J 5/042* (2013.01); *C08L 71/12* (2013.01); *B29B 2009/168* (2013.01); *B29K 2071/00* (2013.01); *C08G 2650/40* (2013.01); *C08J 2371/10* (2013.01)

(58) Field of Classification Search
CPC .. C08K 2201/003; B33Y 70/00; C08G 5/042; C08L 71/12
See application file for complete search history.

(56) References Cited

U.S. PATENT DOCUMENTS

| | | | |
|---|---|---|---|
| 3,065,205 A | 11/1962 | Bonner, Jr. | |
| 3,441,538 A | 4/1969 | Marks | |
| 3,442,857 A | 5/1969 | Thornton | |
| 3,516,966 A | 6/1970 | Berr | |
| 4,540,630 A * | 9/1985 | Wegner | B05D 1/42 427/195 |
| 4,704,448 A | 11/1987 | Brugel | |
| 4,816,556 A | 3/1989 | Gay et al. | |
| 4,897,286 A | 1/1990 | Kosuda et al. | |
| 5,041,335 A | 8/1991 | Inai et al. | |
| 6,177,518 B1 | 1/2001 | Lahijani | |
| 8,765,265 B2 | 7/2014 | Kyomoto et al. | |
| 9,937,667 B2 | 4/2018 | DeFelice et al. | |
| 2005/0207931 A1 | 9/2005 | Hesse et al. | |
| 2018/0200922 A1 | 7/2018 | DeFelice et al. | |

FOREIGN PATENT DOCUMENTS

| | | |
|---|---|---|
| WO | 2014037375 A1 | 3/2014 |
| WO | 2014100320 A1 | 6/2014 |

OTHER PUBLICATIONS

Cheng, Z. D., "Polymorphism and crystal structure identification in poly(aryl ether ketone ketone)s", Macromol. Chem. Phys. 197, 185-213, (1996).
European Search Report Application No. EP 18 18 2749 completed: Nov. 16, 2018;dated Nov. 30, 2018 11 Pages.
U.S. Office Action U.S. Appl. No. 15/872,598 dated Sep. 19, 2019, 8 Pages.

* cited by examiner

*Primary Examiner* — Margaret G Moore
(74) *Attorney, Agent, or Firm* — Welsh IP Law LLC (57) ABSTRACT

A powder composition suitable for use in laser sintering for printing a three-dimensional object. The powder composition includes a polyaryletherketone (PAEK) powder having a plurality of particles. The plurality of particles having a mean diameter of D50. The composition includes a plurality of carbon fibers having a mean length L50. L50 is greater than D50. The particles are substantially non-spherical. A portion of the carbon fiber is embedded into the particle via high intensity mixing.

16 Claims, 6 Drawing Sheets

POLYMER POWDER AND METHOD OF PREPARING THE SAME

CROSS-REFERENCE TO RELATED APPLICATIONS

This application is a continuation of U.S. application Ser. No. 15/872,598, filed Jan. 16, 2018 now U.S. Pat. No. 10,661,479, which claims the benefit of U.S. Provisional Application No. 62/446,470, filed Jan. 15, 2017, U.S. Provisional Application No. 62/446,460, filed Jan. 15, 2017; U.S. Provisional Application No. 62/446,462, filed Jan. 15, 2017; and U.S. Provisional Application No. 62/446,464, filed Jan. 15, 2017. The contents of these prior applications are incorporated herein by reference in their entirety.

TECHNICAL FIELD

The present disclosure generally relates to additive manufacturing technology and techniques, and more specifically relates to a polyetherketoneketone ("PEKK") composition for use in selective laser sintering ("SLS" or "LS"), a method for preparing the PEKK composition, and a method for additively manufacturing an object using the PEKK powder.

BACKGROUND

It is known to use additive manufacturing technology and techniques, together with fine polymer powders, to manufacture high-performance products having applications in various industries (e.g., aerospace, industrial, medical, etc.).

SLS is an additive manufacturing technique that uses electromagnetic radiation from a laser to selectively fuse a powder material typically having an average diameter of 25 to 150 μm into a desired 3-D object. The laser selectively fuses the powder material by scanning cross-sectional layers generated from a 3-D digital description of the desired object onto the top layer of a bed of the powder material. After a cross-sectional layer is scanned, the powder bed is lowered by one layer thickness in a z-axis direction, a new top layer of powder material is applied to the powder bed, and the powder bed is rescanned. This process is repeated until the object is completed. When completed, the object is formed in a "cake" of unfused powder material. The formed object is extracted from the cake. The powder material from the cake can be recovered, sieved, and used in a subsequent SLS process.

PEKK powders are of particular interest in the SLS process because objects that have been manufactured from PEKK powders are characterized by a low flammability, good biocompatibility, and a high resistance against hydrolysis and radiation. The thermal resistance at elevated temperatures as well as the chemical resistance distinguishes PEKK powders from ordinary plastic powders.

An SLS machine typically pre-heats the PEKK powder disposed on the powder bed to a temperature proximate to a melting point of the powder. Pre-heating the PEKK powder makes it easier for the laser to raise the temperature of PEKK powder to a fusing point, and inhibits unwanted distortions in formed objects during cooling. Techniques for pre-heating of PEKK powders are discussed, for example, in U.S. patent application Ser. No. 14/472,817, filed Aug. 29, 2014.

There is an ever-increasing need to manufacture objects via SLS using PEKK powders with improved strengths (e.g., improved tensile strengths in the z-axis direction), improved shape accuracies, and with fewer or no structural flaws (e.g., flaws due to improperly fused layers). Aspects of the present invention are directed to these and other problems.

SUMMARY

The needs set forth herein as well as further and other needs and advantages are addressed by the present teachings, which illustrate solutions and advantages described below.

It is an objective of the present teachings to remedy the above drawbacks and issues associated with prior art selective laser sintering methods.

The present invention resides in one aspect in a powder composition suitable for use in laser sintering for printing a three-dimensional object. The powder composition includes a polyaryletherketone (PAEK) powder having a plurality of particles. The plurality of particles having a mean diameter of D50. The composition includes a plurality of carbon fibers having a mean length L50. L50 is greater than D50.

In yet further embodiments of the present invention the PAEK powder comprises polyetherketoneketone (PEKK) particles.

It yet further embodiments of the present invention the PEKK particles are substantially non-spherical.

In yet further embodiments of the present invention, at least a portion of the plurality of the carbon fibers are at least partially embedded in the plurality of particles of the PAEK powder.

In yet further embodiments of the present invention, the D50 is between 60 and 70 μm.

In yet further embodiments of the present invention, the L50 is between 70 and 90 μm.

In yet further embodiments of the present invention, the D50 is between 63 and 67 μm.

In yet further embodiments of the present invention, the carbon fiber accounts for between 5% and 30% of the powder composition by weight.

In yet further embodiments of the present invention, the carbon fiber accounts for 15% of the powder composition by weight.

In yet further embodiments of the present invention, the powder composition consists essentially of the PAEK powder and the carbon fiber.

In yet further embodiments of the present invention, the PAEK powder consists essentially of PEKK.

In yet further embodiments of the present invention, the plurality of particles have a diameter between 20 and 150 μm.

The present invention resides in one aspect in a method of preparing a powder composition suitable for use in laser sintering for printing a three-dimensional object. The method includes the step of providing a polyaryletherketone (PAEK) powder having a plurality of particles, the plurality of particles having a mean diameter D50. The method further includes the step of providing a plurality of carbon fibers having a medium length L50, the L50 being greater than D50. The method further includes the step of mixing the PAEK powder with the carbon fibers to obtain the powder composition suitable for use in selective laser sintering.

In yet further embodiments of the present invention, the step of providing PAEK powder comprises the step of providing a plurality of polyetherketoneketone (PEKK) particles.

In yet a further embodiment of the present invention, the method includes the step of grinding a PEKK flake to form the PEKK particles, the PEKK particles being substantially non-spherical.

In yet a further embodiment of the present invention, the step of mixing comprises mixing the PAEK powder with the carbon fiber in a high intensity mixer.

In yet a further embodiment of the present invention, the method includes the step of embedding a portion of the plurality of the carbon fibers into a portion of the plurality of particles of the PAEK powder via the high intensity mixing.

In yet a further embodiment of the present invention, the method includes the step of mixing the PAEK powder with the carbon fiber in the high intensity mixer at a speed of greater than 500 rpm for at least one minute.

In yet a further embodiment, the D50 is between 60 and 70 μm.

In yet a further embodiment of the present invention, the method includes the step of heat treating the PAEK powder before the grinding step to evaporate any impurities.

DETAILED DESCRIPTION

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The present invention is especially useful for preparing polymer powders for laser sintering. One such class of polymer powders is Polyaryletherketones ("PAEK") polymers. PAEKs are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

I

II where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

Figure 1:
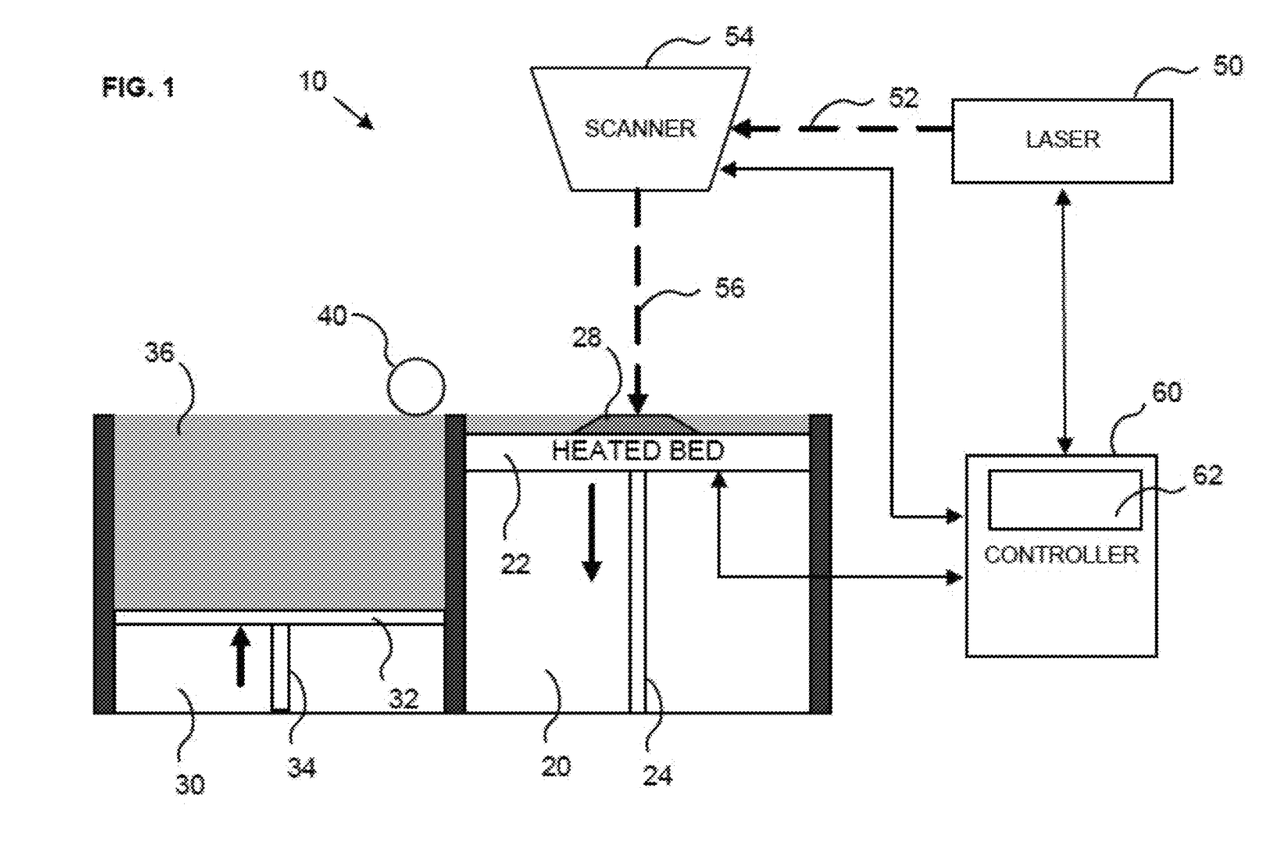
FIG. 1 illustrates an LS machine in accordance with one embodiment of the present invention.

In reference to FIG. 1, an LS system 10 in accordance with the present invention is illustrated. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon.

The temperature of the bed 22 can be variably controlled via a controller 60 in communication with heating elements (not shown) in and or around the bed 22. Furthermore, the LS system 10 according to the invention may include a heating device above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 disposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of an LS system is disclosed, the present invention is not limited and different known LS systems may be employed in the practice of the present invention.

During operation of the LS system 10, a spreader 40 translates across a top surface of the first chamber 20, evenly distributing a layer of powder 36 across either the top surface of the bed 22, or the material previously deposed on the bed 22. The LS system 10 preheats the powder material 36 deposed on the bed 22 to a temperature proximate to a melting point of the powder. Typically, a layer of powder is spread to have a thickness of 125 µm, however the thickness of the layer of powder can be increased or decreased depending on the specific LS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with a build data. The laser selectively fuses powdered material by scanning cross-sections generated from a three-dimensional digital description of the part on the surface of the bed having a layer of the powdered material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

Figure 2:
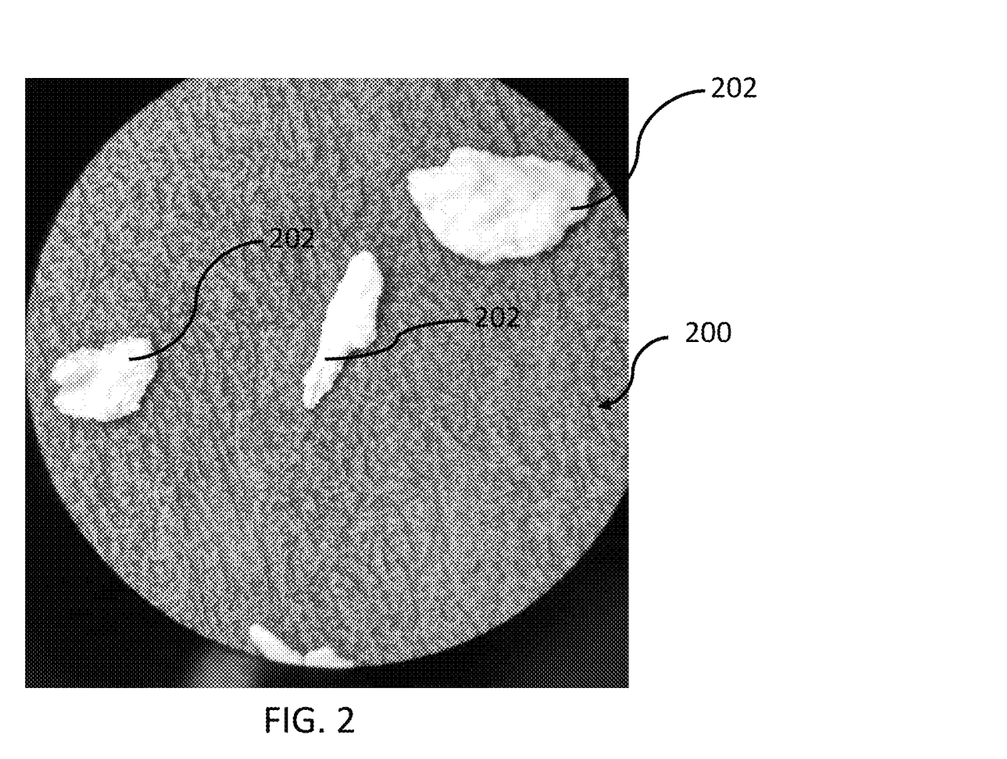
FIG. 2 is an image showing a magnified view of PEKK flake.

In the method of preparing the powders in accordance with the present invention, raw PEKK flake is provided. The raw PEKK flake is commercially available from companies such as Arkema, Inc. of King of Prussia, Pa., and Cytec Industries Inc. of Woodland Park, N.J. The raw PEKK is typically swilled from a chemical reactor and then washed. The raw PEKK is a non-powder material. That is, the raw PEKK is not in the form of a powder that can be used in the LS. As shown in FIG. 2, an image of raw PEKK flake is shown. The raw PEKK flake is in the form of irregularly-shaped particles (e.g., particles that are vaguely round, elongated, flat, etc.) and has an appearance similar to that of Rice Krispies® cereal. The irregularly-shaped particles of the raw PEKK have grain sizes that are orders of magnitude larger than 150 µm, for example. The remainder of the raw PEKK can be in the form of a gel or gel-like form caused by an amount of liquid solvent remaining from the process of producing the raw PEKK.

After the step of providing the raw PEKK flake, a heat treatment step is performed that involves placing the raw PEKK into a shallow pan and heating both within a convection oven. The temperature is ramped up to 200° C. over an one-hour period. The temperature is held at 200° C. for several hours (e.g., 5 or 6 hours). The temperature is ramped up a second time to 225° C. The temperature is held at 225° C. for a minimum of one hour and for preferably between one and four hours. The temperature is then ramped up a third time to 250° C. The temperature is held at 250° C. for a minimum of one hour and for preferably between one and four hours. The heat treatment step evaporates any remaining liquid solvent, and causes at least substantially all of the raw PEKK to be in the form of irregularly-shaped particles. The heat treatment step also causes some coalescence of the irregularly-shaped particles. However, the bulk density of the raw PEKK remains low after the heat treatment step.

After the heat-treating step, a cooling step is performed that involves powering-off the convection oven heater and allowing the raw PEKK to cool naturally.

The heat-treatment process is the subject of U.S. patent application Ser. No. 15/872,478 filed on Jan. 16, 2018 (Published as US-2018-0200922-A10) by Hexcel Corporation and titled "Polymer Powder and Method of Using the Same." The disclosure of that reference is hereby incorporated by reference.

After the cooling step, a grinding step is performed that involves grinding the raw PEKK to form what will hereinafter be referred to as the "PEKK powder." The grinding step can be performed using known grinding techniques performed by companies such as Aveka, Inc. of Woodbury, Minn. Upon completion of the grinding step, the particles of the PEKK powder are significantly smaller (i.e., several degrees of magnitude smaller) than the particles of the raw PEKK. The particles of the PEKK powder are more consistent and regular in shape as compared to the particles of the raw PEKK; however, the particles of the PEKK powder are still irregularly-shaped in comparison to the spherical-shaped particles of prior art PEKK powders that are preheated after grinding.

In accordance with the present invention, a person of ordinary skill in the art and familiar with this disclosure will understand that the grinding may also be referred to as pulverization, or jet milling. In addition, a person of ordinary skill in the art and familiar with this disclosure will understand that it may also be employed with other polymer powders, includes those in the PAEK family.

Figure 3:
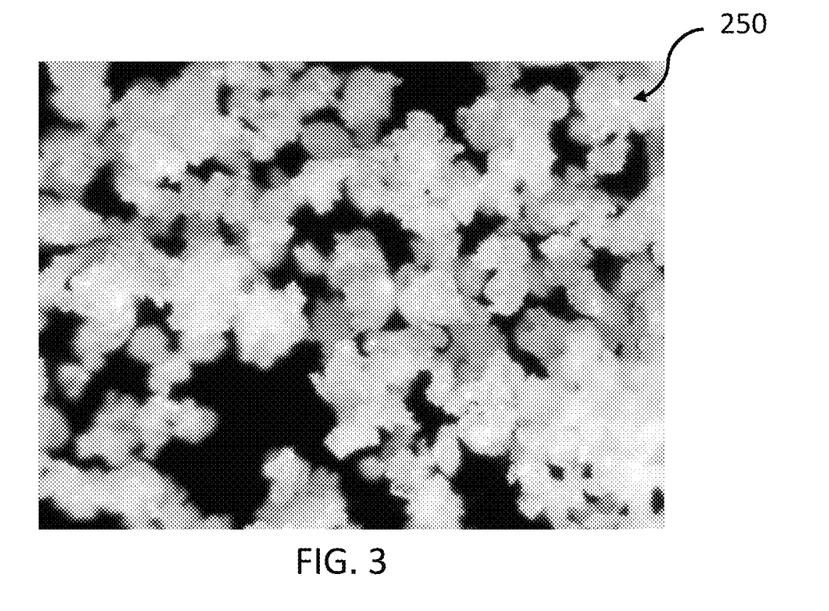
FIG. 3 is an image showing a magnified view of a plurality of PEKK particles.

FIG. 3 shows an image showing magnified particles after the grinding process. In some embodiments of the present invention, the PEKK flake is ground by a jet milling method. For example, Aveka CCE Technologies based in Cottage Grove, Minn., USA provides grinding and classification services. An air classifying mill is used that incorporates dense phase micronization using turbulent, free jets in combination with high efficiency centrifugal air classification within a common housing. This provides commination by high probability particle-on-particle impact for breakage and a high degree of particle dispersion for separation.

In accordance with the present invention, the raw PEKK flake is ground in a PAEK powder comprising a plurality of PEKK particles. The PEKK particles range in size from less than 10 µm to about 200 µm. A person of ordinary skill in the art and familiar with this disclosure will understand that the particle size range will vary based on the type of polymer being milled and the specific parameters of the milling process. It is known in the art to reduce or eliminate particles having a diameter below a cut-off point, for example 20 µm, as it has been found that particles in this range may hinder use of the powder in the LS process or may degrade the mechanical properties of parts built via LS therefrom. For example, International Patent Application WO2014100320 discloses such a method for preparing powders for use in selective laser sintering.

In reference to FIG. 3, an image captured using a microscope of a plurality of PEKK particles is shown. The resultant particles are non-spherical and substantially angular. This is a result of the jet milling process that performs particle comminution via particle-on-particle impact. The inventors have discovered that the substantial non-spherical PEKK particles perform better in the LS process. For example, the non-spherical particles are more easily distributed on the bed table for the LS process and the non-spherical particles result in substantially stronger parts, particularly in the out of plane axis. The increased performance of non-spherical particles is due in part to the increased ability for larger and smaller particles to pack together enhancing the strength of the laser fusion.

Figure 7:
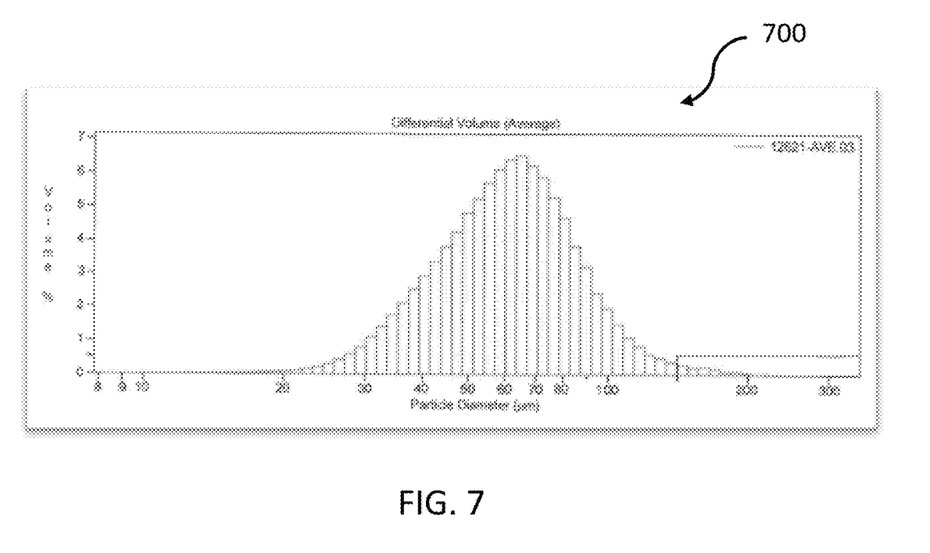
FIG. 7 is a chart showing a distribution of PEKK particles by particle diameter.
Figure 8:
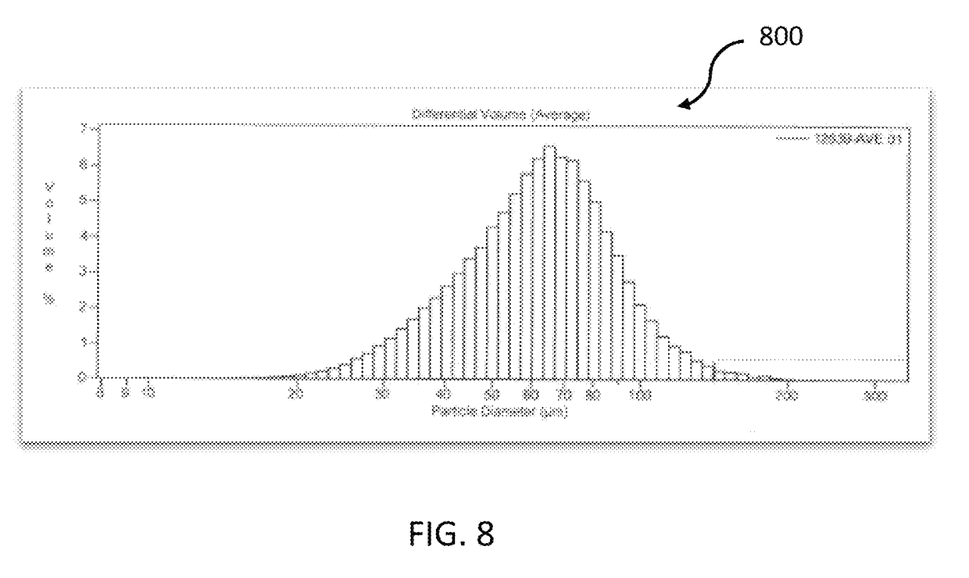
FIG. 8 is a chart showing a distribution of PEKK particles by particle diameter.

In reference to FIGS. 7-8, two histograms are shown illustrating differential volume of a plurality of PEKK particles for use in accordance with the present invention and in which fine particles have been removed in accordance with the above described method. The differential volume was determined using the coulter counter method (following ISO 13319). The coulter method of sizing and counting particles is based on measurable changes in electrical impedance produced by nonconductive particles suspended in an electrolyte. A small opening (aperture) between electrodes is the sensing zone through which suspended particles pass. The coulter method enables the determination of particle distribution by size according to particle mass relative to the over mass of the sample or to particle count relative to the overall count of particles in the sample. In reference to the information shown in FIGS. 7-8 and generally in this application, the term particle diameter is used to refer to the size of the particles. A person of ordinary skill in the art and familiar with this disclosure will understand that in context of the particle size, the term diameter does not indicate that the particles are spherical, but instead refers to the largest size of the particle as determined via the coulter method. As discussed above, the plurality of PEKK particles are highly angular and substantially non-spherical due to the particle-on-particle contact impacts during the jet milling process.

In reference to FIG. 7, the chart 700 shows information relating to a plurality of PEKK particles associated with lot number 300393. The plurality of particles have a mean diameter of 64.20 µm, and a median diameter of 61.34 µm.

In reference to FIG. 8, the chart 800 shows information relating to a plurality of PEKK particles associated with lot number 7215. The plurality of particles has a mean diameter of 65.16 µm and a median diameter of 62.85 µm. In some embodiments of the present invention, the PEKK powder has a mean diameter, also referred to as D50, between 60 µm and 70 µm. In yet other embodiments of the present invention, the PEKK powder has a mean diameter between 63 µm and 67 µm.

After the grinding step, another optional processing step is performed that involves adding an amount of carbon fiber to the PEKK powder. The addition of the carbon fiber has the effect of reinforcing and/or stiffening the resulting object. Unlike prior art techniques that involve use of carbon fiber with an average length L50 that is less than the average grain size d50 of the PEKK powder particles, the present method involves use of carbon fiber with an average length L50 that is longer than the average grain size d50 of the PEKK powder particles. In some embodiments, PEKK powder and carbon fibers can be selected such that d50<L50<d90. The carbon fiber and the PEKK powder can be combined using a heat shear process that involves combining the two components using high speed, high torque mixing elements (e.g., a Henschel Mixer®). This has the effect of forcibly dispersing fiber clumps. If left intact, these clumps negatively impact both electrical behaviors and mechanics of the mixture. The more commonly used tumbling blenders (e.g., V-type blenders) lack the energy to disperse fibers correctly. It can be advantageous to prepare large batches of the PEKK powder and carbon fiber mixture for the sake of reducing variability in the processes.

In accordance with one embodiment of the present invention carbon fiber available from Hexcel Corporation of Stamford, Conn., USA and sold under the brand name HEXTOW® AS4 is employed. The carbon fiber is a continuous, high strength, high strain, PAN based fiber. In this embodiment, the carbon fiber has a filament diameter of approximately 7.1 µm and is wound on a cardboard tube. It should be understood to a person having ordinary skill in the art that different types and brands of carbon fibers may be employed, and that the present invention is not specifically limited in this regard.

The carbon fiber is milled prior to incorporation into the PEKK powder to achieve the desired carbon fiber length as determined by the average L50. The carbon fiber is milled by a miller such as E&L Enterprises Inc. in Oakdale, Tenn., USA. For example, in one embodiment of the present invention, the mean carbon length, L50, is 77 µm. The minimum length measured is 38.15 µm, the maximum length measured is 453 µm, and the standard deviation is 42.09 µm.

In accordance with the present invention, the milled carbon fiber included in the powder has a mean length L50 that is greater than the mean diameter of the plurality of particles D50. In some embodiments, the L50 is greater than 70 µm. In some embodiments of the present invention, the L50 of the carbon fiber is between 70 µm and 90 µm. In yet other embodiments of the present invention, the average fiber length L50 is between 70 µm and 80 µm.

A powder composition suitable for use in a selective laser sintering for printing a three-dimensional object is prepared combining a PEKK powder with the carbon fiber. In some embodiments of the present invention the composition includes 85% by weight of PEKK powder and 15% by weight carbon fiber. It yet other embodiments of the present invention, the amount of carbon fiber is varied relative to the polymer powder to achieve composition for SLS. In some embodiments of the present invention, one or more additives are added to the matrix to affect the properties of the SLS composition, for example, during the printing process or in the printed article. It will be understood to a person of ordinary skill in the art and familiar with this invention, that the ratio of carbon to polymer may vary and the above examples are provided for illustration purposes. The polyaryletherketone (PAEK) powder has a plurality of particles having a mean grain size D50. A plurality of carbon fibers have a mean length L50. L50 is greater than D50.

The plurality of carbon fibers and the plurality of PEKK particles are mixed in a high intensity mixer. This may include the Henschel FM 200 high intensity mixer offered by Zeppelin. In the process of high intensity mixing the carbon fibers and PEKK particles are accelerated at high speeds causing collisions between the fibers and the particles thereby embedding the fibers into the PEKK particles. For example, a composition in accordance with the present invention was prepared using a high energy mixer (Zeppelin FM-200) that ran 7 minutes per batch (maximum 100 lbs fit in the mixer) and the slowest speed is 600 RPM. It has been discovered that embedding the carbon fiber into the particles via the high intensity mixing method results in a portion of the fiber in the particle and a portion of the fiber outside the particle. This configuration has been shown to significantly increase the mechanical properties of parts made from the composition powder using the LS method.

Figure 4:
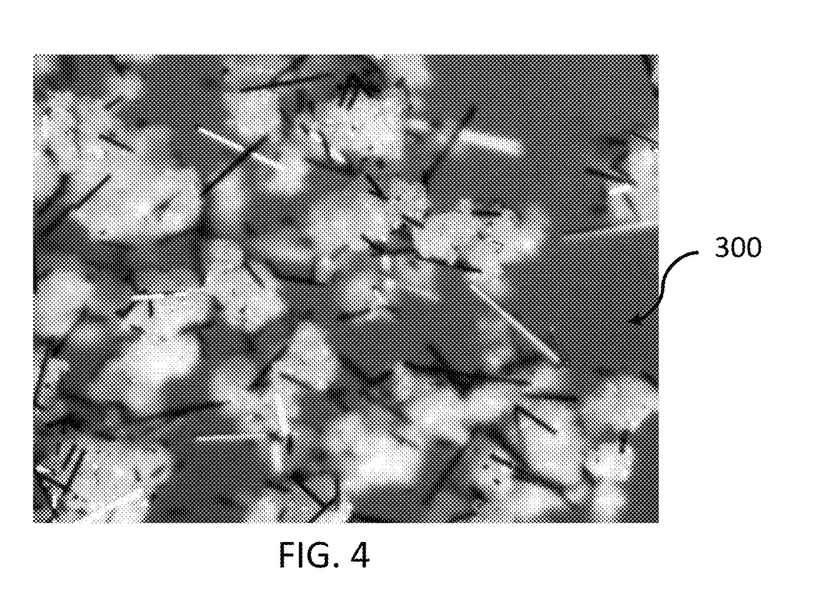
FIG. 4 is an image showing a magnified view of a plurality of PEKK particles and a plurality of carbon fibers.
Figure 5:
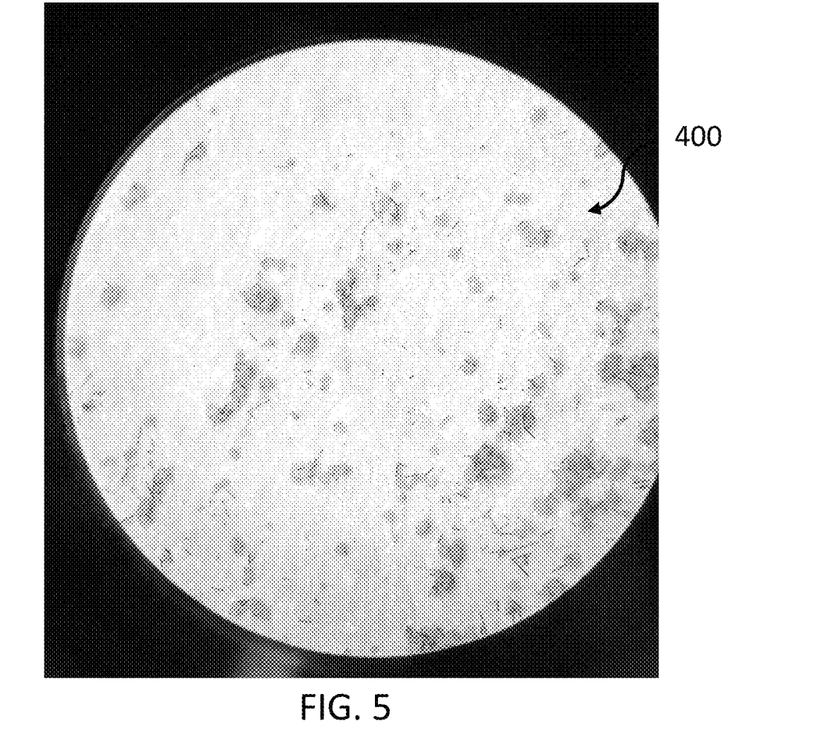
FIG. 5 is an image showing a magnified view of a plurality of PEKK particles and a plurality of carbon fibers.
Figure 6:
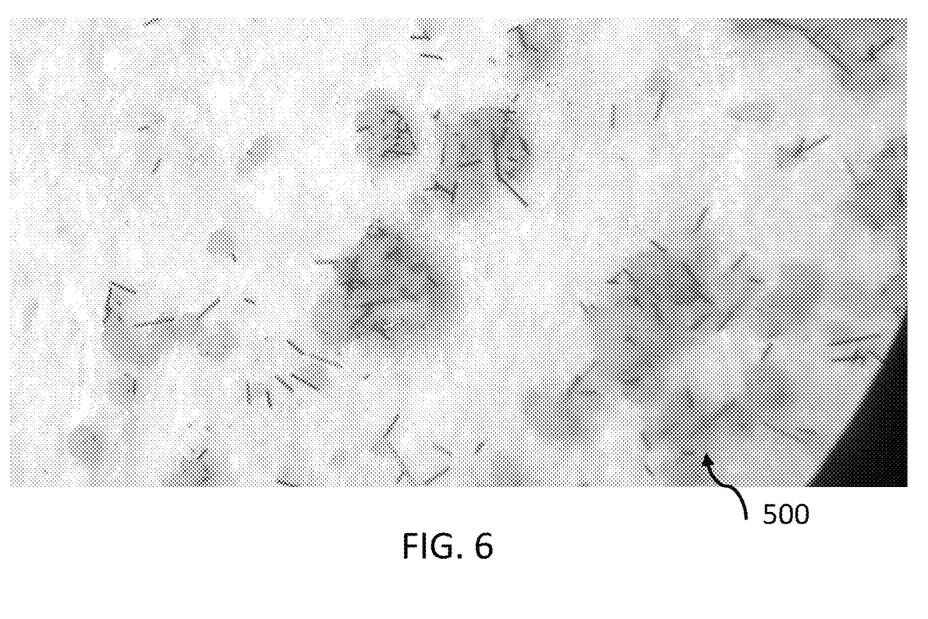
FIG. 6 is an image showing a portion of the image shown in FIG. 4.

In reference to FIGS. 4-6, images 400, 500, 600 are provided showing magnified views of a plurality of PEKK particles and a plurality of carbon fibers after completion of the high energy mixing. As shown in the images, at least a portion of the plurality of the carbon fibers are at least partially embedded in the plurality of particles of the PAEK powder and a least a portion of the carbon fiber is protruding therefrom. The images 400, 500, 600 also illustrate that the parties are substantially non-spherical and highly angular.

Figure 9:
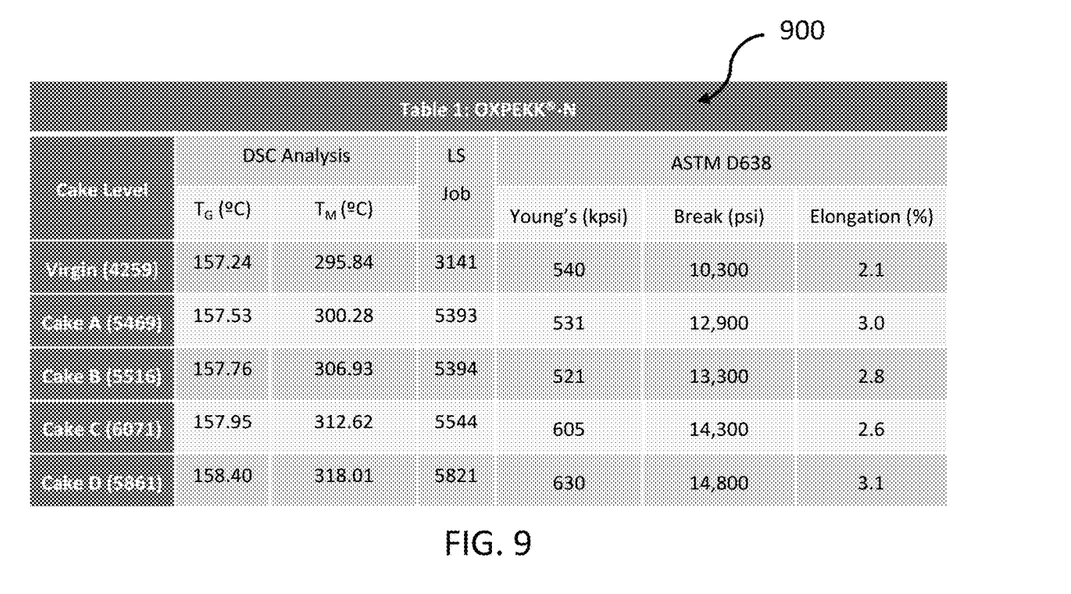
FIG. 9 is table showing data of a PEKK powder composition excluding carbon fiber.
Figure 10:
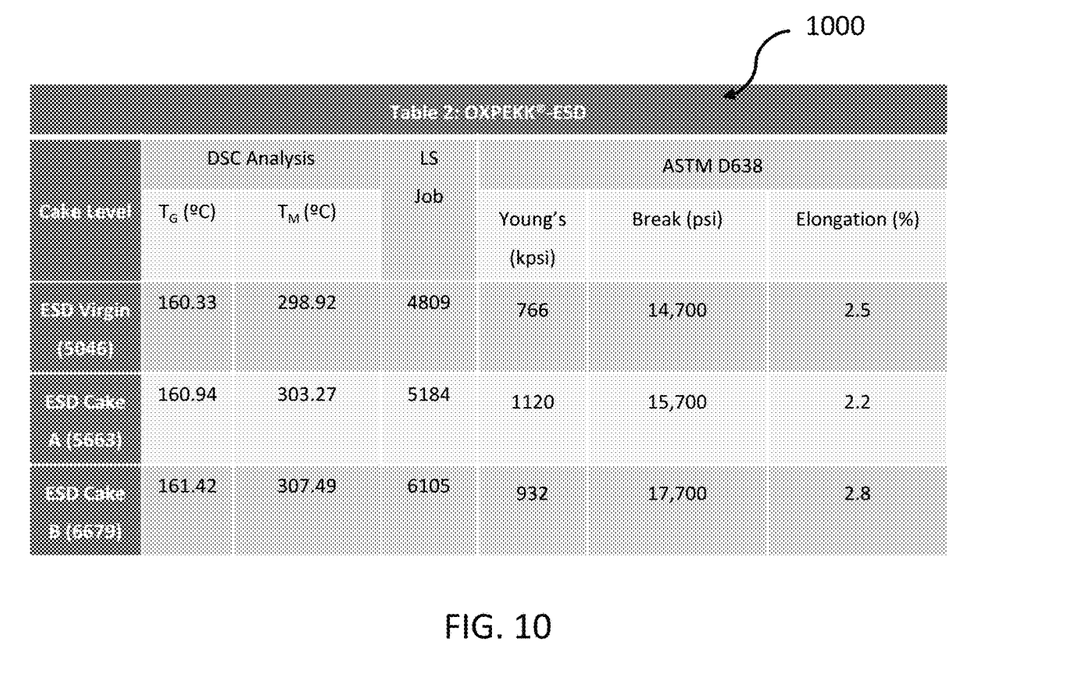
FIG. 10 is table showing data of a PEKK powder composition including carbon fiber.

In reference to tables shown in FIGS. 9 and 10, a comparison of parts made from a first composition consisting essentially of PEKK powder and a second composition consisting essentially of PEKK powder and carbon fiber prepared in accordance with the present invention is shown. The powders are sold under the names OXPEKK®-N and OXPEKK®-ESD, wherein N includes PEKK powder and ESD includes PEKK powder blended with carbon fiber. The comparison confirms that parts made with the carbon fibers in accordance with the present invention are unequivocally stronger than parts made from pure PEKK powder.

In reference to FIG. 9, Table 1 900 shows the properties of PEKK powder sold under the brand name OXPEKK®-N from Oxford Performance Materials, Inc. The left column, Cake Level, identifies the number of LS cycles that an OXPEKK®-N powder has been exposed to. Virgin refers to a powder that has not been exposed to LS process, while Cake A has been exposed to 1 LS process, Cake B—2 LS process, etc. Each cake level was subjected to an LS build process that manufactured test rods in the x-plane. The tensile properties were determined pursuant to ASTM D638. The powder was manufactured in accordance with the above described method. Specifically, it consisted essentially of PEKK powder. The particles were substantially non-spherical and the carbon fiber was mixed with the PEKK powder via high intensity mixing to partially embed the fiber into the particles.

In reference to FIG. 10, Table 2 1000 shows the properties of ESD PEKK powder sold under the brand name OXPEKK®-ESD from Oxford Performance Materials, Inc. The left column, Cake Level, identifies the number of LS cycles that an OXPEKK®-ESD powder has been exposed to. Virgin refers to a powder that has not been exposed to LS process, while Cake A has been exposed to 1 LS process, Cake B—2 LS processes. Each ESD cake level was subjected to an LS build process that manufactured test rods in the x-plane. The tensile properties were determined pursuant to ASTM D638. The powder was manufactured in accordance with the above described method. Specifically, it consisted essentially of PEKK powder and carbon fiber in a ratio of 85/15 by weight. The D50 of the powder was between 60 µm and 70 µm and the L50 of the powder was between 70 µm and 80 µm. The particles were substantially non-spherical and the carbon fiber was mixed with the PEKK powder via high intensity mixing to partially embed the fiber into the particles.

Another aspect of the invention is a PEKK powder manufactured according to the above-described method.

Another aspect of the invention is a method for additively manufacturing an object using a PEKK powder manufactured according to the above-described method. The method involves the step of selective laser sintering the PEKK powder, and excludes any intentional pre-heating step such as that typically performed using prior art techniques. Aside from the heating of the PEKK powder by the laser, the only other heating of the PEKK powder will be unintentional heating caused by movement or manipulation of the PEKK powder.

What is claimed is:

1. A powder composition suitable for use in laser sintering for printing a three-dimensional object, the powder composition comprising:
   a first fraction comprising a polyaryletherketone (PAEK) powder having a plurality of particles, the plurality of particles having a mean diameter D50 between 25 µm and 150 µm;
   a second fraction comprising a plurality of carbon fibers, the plurality of particles having a mean length L50;
   wherein the L50 is between D50 and a D90 of the plurality of particles of the first fraction.

2. The powder composition of claim 1, wherein the L50 is between D50 and 90 µm.

3. The powder composition of claim 2, wherein the PEKK particles are substantially non-spherical.

4. The powder composition of claim 3, wherein the second fraction is between 5% and 30% of the powder composition by weight.

5. The powder composition of claim 4, wherein the L50 is between D50 and 80 µm.

6. A three dimensional object obtained from a polyaryletherketone (PAEK) powder by selective laser sintering by applying a layer of the powder on a bed of a laser sintering machine, solidifying selected points of the applied layer of powder by irradiation, successively repeating the step of applying the powder and the step of solidifying the applied layer of powder until all cross sections of the three-dimensional object are solidified, wherein the powder has the following structural characteristics:
   a first fraction comprising a polyaryletherketone (PAEK) powder having a plurality of particles, the plurality of particles having a mean diameter D50 between 25 µm and 150 µm;
   a second fraction comprising a plurality of carbon fibers, the plurality of particles having a mean length L50;
   wherein the L50 is between D50 and a D90 of the plurality of particles of the first fraction.

7. The three dimensional object of claim 6, wherein the L50 is between D50 and 90 µm.

8. The three dimensional object of claim 7, wherein the PEKK particles are substantially non-spherical.

9. The three dimensional object of claim 8, wherein the second fraction is between 5% and 30% of the powder composition by weight.

10. The three dimensional object of claim 9, wherein the L50 is between D50 and 80 μm.

11. A method of preparing a powder composition suitable for use in laser sintering for printing a three-dimensional object, the method including the steps of:
providing a first fraction comprising a polyaryletherketone (PAEK) powder having a plurality of particles, the plurality of particles having a mean diameter D50 between 25 μm and 150 μm;
a second fraction comprising a plurality of carbon fibers, the plurality of particles having a mean length L50, the L50 is between D50 and a D90 of the plurality of particles of the first fraction L50 being greater than D50;
mixing the first fraction with the second fraction to obtain the powder composition suitable for use in selective laser sintering.

12. The method of claim 11, further comprising the step of:
grinding a PAEK flake to form the PAEK particles, the PAEK particles being substantially non-spherical.

13. The method of claim 12, wherein the step of mixing further comprises mixing the first fraction and the second fraction in a high intensity mixer.

14. The method of claim 13, further comprising the step of:
embedding a portion of the plurality of the carbon fibers into a portion of the plurality of particles of the PAEK powder via the high intensity mixing.

15. The method of claim 14, further comprising the step of:
mixing the first fraction with the second fraction in the high intensity mixer for an operation speed of greater than 500 rpm for at least one minute.

16. The method of claim 11, further comprising the step of: heat treating the PAEK powder before the mixing step to evaporate any impurities.

* * * * *